United States Patent
Zelig et al.

(10) Patent No.: US 7,339,929 B2
(45) Date of Patent: Mar. 4, 2008

(54) VIRTUAL PRIVATE LAN SERVICE USING A MULTICAST PROTOCOL

(75) Inventors: David Zelig, Givataim (IL); Leon Bruckman, Petah Tikva (IL); Gal Mor, Herzliya (IL); Zvi Menahemi, Modi'in (IL)

(73) Assignee: Corrigent Systems Ltd., Tel Aviv (IL)

( * ) Notice: Subject to any disclaimer, the term of this patent is extended or adjusted under 35 U.S.C. 154(b) by 944 days.

(21) Appl. No.: 10/226,525

(22) Filed: Aug. 23, 2002

(65) Prior Publication Data

US 2004/0037279 A1 Feb. 26, 2004

(51) Int. Cl.
H04L 12/28 (2006.01)

(52) U.S. Cl. .................................. 370/390; 370/392

(58) Field of Classification Search ............. 370/389, 370/390, 312, 391, 392, 395, 395.1, 397, 370/398, 399, 400, 395.2, 395.3, 395.31, 370/395.52, 395.53, 401, 402, 386
See application file for complete search history.

(56) References Cited

U.S. PATENT DOCUMENTS

| | | | |
|---|---|---|---|
| 5,983,360 A | 11/1999 | Ugajin | |
| 6,032,194 A | 2/2000 | Gai et al. | |
| 6,041,166 A * | 3/2000 | Hart et al. | 709/238 |
| 6,205,488 B1 | 3/2001 | Casey et al. | |
| 6,275,493 B1 | 8/2001 | Morris et al. | |
| 6,304,575 B1 | 10/2001 | Carroll et al. | |
| 6,330,229 B1 | 12/2001 | Jain et al. | |
| 6,339,595 B1 | 1/2002 | Rekhter et al. | |
| 6,408,001 B1 | 6/2002 | Chuah et al. | |
| 6,446,131 B1 | 9/2002 | Khansari et al. | |
| 6,466,985 B1 | 10/2002 | Goyal et al. | |
| 6,563,793 B1 | 5/2003 | Golden et al. | |
| 6,604,136 B1 | 8/2003 | Chang et al. | |
| 6,628,624 B1 | 9/2003 | Mahajan et al. | |
| 6,760,775 B1 | 7/2004 | Anerousis et al. | |
| 6,765,921 B1 | 7/2004 | Stacey et al. | |
| 6,778,496 B1 | 8/2004 | Meempat et al. | |
| 6,879,594 B1 | 4/2005 | Lee et al. | |
| 6,886,043 B1 | 4/2005 | Mauger et al. | |
| 6,925,054 B1 | 8/2005 | Atterton et al. | |
| 6,985,447 B2 | 1/2006 | Gibson et al. | |
| 7,079,544 B2 | 7/2006 | Wakayama et al. | |

(Continued)

OTHER PUBLICATIONS

ISO/IEC Standard 7498-1: 1994, "Information Technology—Open Systems Interconnection-Basic Reference Model—Part 1: The Basic Model" (available from American National Standards Institute, New York).

(Continued)

Primary Examiner—Brenda Pham
(74) Attorney, Agent, or Firm—Christie, Parker & Hale, LLP (57) ABSTRACT

A method for data broadcast over a network includes receiving at a virtual bridge a data packet to be flooded over the network, and passing the data packet from the virtual bridge to a multicast-capable router, along with a broadcast indication. Responsive to the broadcast indication, the router determines a group of destination addresses to which the packet should be multicast, and creates copies of the packet for transmission over the network to the destination addresses in the group.

40 Claims, 5 Drawing Sheets

U.S. PATENT DOCUMENTS

| | | | |
|---|---|---|---|
| 2001/0022786 | A1 | 9/2001 | King et al. |
| 2002/0085548 | A1 | 7/2002 | Ku et al. |
| 2002/0176450 | A1 | 11/2002 | Kong et al. |
| 2003/0012202 | A1* | 1/2003 | Fukutomi ............... 370/395.52 |
| 2003/0061338 | A1 | 3/2003 | Stelliga |
| 2003/0088698 | A1 | 5/2003 | Singh et al. |
| 2003/0147344 | A1 | 8/2003 | Stewart et al. |
| 2003/0189898 | A1* | 10/2003 | Frick et al. .................. 370/227 |
| 2004/0202157 | A1 | 10/2004 | Chase et al. |
| 2004/0202171 | A1 | 10/2004 | Hama |

OTHER PUBLICATIONS

Rosen, et al., in Request for Comments (RFC) 3031 of the Internet Engineering Task Force (IETF), entitled: " Multiprotocol Label Switching Architecture", Jan. 2001. ( Available at: www.ietf.org/rfc.html).

"IEEE Standard for Information Technology, Telecommunications and Information Exchange between Systems, Local and Metropolitan Area Networks Common Specifications, Part 3: Media Access Control (MAC) Bridges", Published as ANSI/IEEE Standard 802.1D (1998). Available at: standards.ieee.org/catalog/IEEE802.1.html.

J. Lau , et al., "Layer Two Tunneling Protocol (Version 3) L2TPv3" (IETF draft-ietf-l2tpext-l2pt-base-03.txt), Nov. 2002.

Martini, et al., "Encapsulation Methods for Transport of Ethernet Frames over IP and MPLS Networks", (IETF dratf-martini-ethernet-encap-mpls-01.txt), Nov. 2002.

Martini, et al., "Encapsulation Methods for Transport of Layer 2 Frames over IP and MPLS"Networks (IETF dratf-martini-l2circuit-encap-mpls-04.txt), Nov. 2001.

Deering, RFC 1112, "Host Extensions for IP Multicasting", Aug. 1989.

Tricci So, et al., "Ethernet Pseudo Wire Emulation Edge-to-Edge (PWE3)", (draft-so-pwe3-ethernet.txt), Sep. 2002.

T. Senevirathne, "Virtual Private LAN Service (VPLS) Solution Using GRE Based IP Tunnels", (draft-tsenevir-gre-vpls-00.txt), Feb. 2002.

Prayson Pate, et al., "Framework for Pseudo Wire Emulation Edge-to-Edge (PWE3)", (draft-ietf-pwe3-framework-01.txt), Jun. 2002.

Xipeng Xiao, et al., "Requirements for pseudo-wire emulation edge-to-edge (PWE3)" (draft-ietf-pwe3-requirements-03.txt), Jun. 2002.

W. Augustyn, et al., "Requirements for Virtual Private LAN Services" (draft-augustyn-vpls-requirements-02.txt), Feb. 2002.

Marc Lasserre, et al., "Virtual Private LAN Services Over MPLS" (draft-lasserre-vkompella-ppvpn-vpls-01.txt), Sep. 2002.

"IEEE Standards for Information Technology, Telecommunications and Information Exchange between Systems, Local and Metropolitan Area Networks, Common Specifications, Part 3: Media Access Control (MAC) Bridges," ANSI/IEEE Standard 802.1D (1998) (On Order).

"Information Processing Systems—Open Systems Interconnection-Basic Reference Model—Part 1: The Basic Model," ISO/IEC standard 7498-1: 1994 (On Order).

Rosen, et al., "Multiprotocol Label Switching Architecture," Request for Comments (RFC) 3031 of the Internet Engineering Tast Force (IETF), Jan. 2001 (On Order).

Martini, et al., "Encapsulation Methods for Transport of Ethernet Frames Over IP and MPLS Networks," IETF draft-matini-ethernet-encap-mpls-01.txt, Jul. 2002 (On Order).

Townsley, et al., "Layer Two Tunneling Protocol (Version 3) 'L2TPv3'" IETF draft-ietf-l2tpext-l2tp-base-03.txt, Jun. 2002 (On Order).

Martini, et al., "Encapsulation Methods for Transport of Layer 2 frames over MPLS" IETF draft-martini-l2circuit-encap-mpls-04.txt, Nov. 2001 (On Order).

Lasserre, et al., "Virtual Private LAN Services over MPLS" IETF draft-lasserre-vkompella-ppvpn-vpls-02.txt, Jun. 2002 (On Order).

USPTO Office Action dated Mar. 15, 2006, for U.S. Appl. No. 09/935,970, filed Aug. 23, 2001, in the name of Zelig.

USPTO Office Action, dated Jan. 23, 2006, for U.S. Appl. No. 10/057,332, filed Jan. 25, 2002, in the name of Kotser.

USPTO Office Action, dated Jan. 11, 2006, for U.S. Appl. No. 10/061,721, filed Feb. 1, 2002, in the name of Khill.

"Star Network" "Star Topology" "Mesh Network", Microsoft Computer Dictionary (Fifth Edition), 2002. Microsoft Press.

Null, Linda, The Essentials of Computer Organization and Architecture 2003, Jones and Barlett Computer Science, p. 536.

USPTO Office Action, dated Oct. 21, 2005, for U.S. Appl. No. 10/337,382, filed Jan. 7, 2003, in the name of Zelig et al.

* cited by examiner

VIRTUAL PRIVATE LAN SERVICE USING A MULTICAST PROTOCOL

FIELD OF THE INVENTION

The present invention relates generally to communication networks, and specifically to methods and systems for providing virtual private LAN services (VPLS).

BACKGROUND OF THE INVENTION

Local Area Networks (LANs) connect computing systems together. LANs of all types can be connected together using Media Access Control (MAC) bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998), which is incorporated herein by reference. The 802.1D standard is available at standards.ieee.org/catalog/IEEE802.1.html.

Each computing system connects to a LAN through a MAC device. MAC bridges that implement the 802.1D standard allow MAC devices attached to physically separated LANs to appear to each other as if they were attached to a single LAN. A MAC bridge functions within the Logical Link Control (LLC) sublayer of the Network Layer defined in ISO/IEC standard 7498-1: 1994, entitled "Information Processing Systems—Open Systems Interconnection-Basic Reference Model—Part 1: The Basic Model" (available from the American National Standards Institute, New York, N.Y.), which is incorporated herein by reference. The bridge includes two or more MAC devices that interconnect the bridge ports to respective LANs.

MAC bridges maintain a database to map destination MAC addresses of the packets they receive to bridge ports. The bridge builds the database by means of a learning process, in which it associates the source MAC address of each incoming packet with the port on which the packet was received. When the bridge receives an incoming packet whose destination address is not located in the database, it broadcasts the packet through all its available ports, except the one through which the packet arrived. Other MAC bridges that do not recognize the destination address will further broadcast the packet. Through the broadcast mechanism, the packet will eventually traverse all interconnected bridges at least once, and will ultimately reach its destination. A similar broadcast operation is performed independently for having a destination MAC address of a broadcast or multicast group, although the multicast scope may be reduced if the bridge is aware (by use of special protocols) of the physical locations of the target addresses in each multicast group. The operation of broadcast or multicast of a packet is referred to (independently of the reason) as a flooding process.

Multiprotocol Label Switching (MPLS) is gaining popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This RFC, as well as other IETF RFCs and drafts cited hereinbelow, is available at www.i-etf.org. In conventional IP routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. The packet receives a short, fixed-length label identifying the FEC to which it belongs. All packets in a given FEC are passed through the network over the same path by label-switching routers (LSRs). Unlike IP routers, LSRs simply use the packet label as an index to a look-up table, which specifies the next hop on the path for each FEC and the label that the LSR should attach to the packet for the next hop.

Since the flow of packets along a label-switched path (LSP) under MPLS is completely specified by the label applied at the ingress node of the path, a LSP can be treated as a tunnel through the network. Such tunnels are particularly useful in network traffic engineering, as well as communication security. MPLS tunnels are established by "binding" a particular label, assigned at the ingress node to the network, to a particular FEC.

One of the most promising uses of MPLS tunnels is in transporting layer-2 packets, such as Ethernet frames or ATM cells, over high-speed, high-performance packet networks. Methods for this purpose are described, for example, by Martini et al., in "Encapsulation Methods for Transport of Ethernet Frames Over IP and MPLS Networks" (IETF draft-martini-ethernet-encap-mpls-01.txt, July, 2002), which is incorporated herein by reference. This draft defines mechanisms for encapsulating Ethernet traffic for transportation over IP networks using MPLS or other tunneling methods, such as Generic Routing Encapsulation (GRE), as are known in the art. L2TPv3, described by Townsley et al in "Layer Two Tunneling Protocol (Version 3) 'L2TPv3'" (IETF draft-ietf-l2tpext-l2tp-base-03.txt, June, 2002), which is incorporated herein by reference, is another technique for tunneling layer-2 packets over IP networks, which can be used, inter alia, to carry Ethernet packets within a provider network. The term "layer 2" refers to the second layer in the protocol stack defined by the well-known Open Systems Interface (OSI) model, also known as the logical link, data link, or MAC, layer.

According to the model proposed by Martini et al., native Ethernet LANs are connected to the IP network by provider edge (PE) devices, which are linked one to another by tunnels through the IP network. The sending (ingress) PE device receives Ethernet frames from a customer edge (CE) device on the source LAN. It encapsulates the frames in packets with the label stack required for transmitting the packets through the appropriate tunnel to the receiving (egress) PE device. The label structure includes a "virtual connection" label (or VC label), which is used by the egress PE device to de-encapsulate the frame and add the proper MAC header and, optionally, a VLAN tag for transmission on the target LAN to the destination CE device. Details of the VC label structure are described by Martini et al. in an IETF draft entitled "Encapsulation Methods for Transport of Layer 2 Frames over MPLS" (IETF draft-martini-l2circuit-encap-mpls-04.txt, November, 2001), which is incorporated herein by reference.

As a result of this encapsulation and associated processing functions, the IP network emulates Ethernet trunking and switching behavior and can thus be treated as an Ethernet "pseudo wire" (PW). In other words, from the point of view of native Ethernet LANs that are connected to tunnels through the IP network, each PW is a virtual Ethernet point-to-point connection, emulating a physical connection between two Ethernet port.

Taking this functionality a step further, Lasserre et al. describe a method to create a virtual private LAN service (VPLS) using a MPLS network in "Virtual Private LAN Services over MPLS" (IETF draft-lasserre-vkompella-ppvpn-vpls-02.txt, June, 2002), which is incorporated herein by reference. Although this reference is limited in scope to MPLS tunneling, the PW connection between the nodes can more generally be implemented using any available PW protocol, such as GRE or L2TPv3. A VPLS (also known as a transparent LAN service—TLS) provides bridge-like functionality between multiple sites over a large network. Users connect to the VPLS via regular node interfaces, and PWs between the nodes to which the users are connected form the VPLS entity itself. Every node in a VPLS acts as a virtual bridge. A virtual bridge node has "virtual ports," which are the endpoints of PWs that are part of the VPLS. The interfaces to which the users are actually connected are physical ports at the network edges. Both virtual and real interfaces are treated identically from the point of view of frame forwarding and address learning. A single provider node can participate in multiple VPLS instances, each belonging to a different user.

The VPLS network topology is completely specified by the PW connections. When the PW connections are MPLS tunnels, the VPLS depends on the MPLS protocol to actually transfer the packets through the network. Since MPLS networks supply an alternative, virtual implementation of layer-2 network communications, VPLS can be thought of as parallel to conventional virtual bridged local area networks, as specified in the IEEE 802.1Q standard. From the perspective of the end-user, the VPLS network is transparent. The user is provided with the illusion that the provider network is a single LAN domain. User nodes on different physical LANs can thus be joined together through VPLS connections to define a virtual private network (VPN), which appears to the users to be a single Ethernet LAN.

VPLS networks are still in the development stage, and there are as yet no clear standards for loop prevention in such networks. One possible solution to avoiding loops in VPLS topologies is to configure the VPLS network as a full mesh of tunnels, as specified by Lasserre et al. in the above-mentioned draft. In a full mesh, each PE is directly connected to every other PE in the same VPN by a single PW. To avoid loops in the VPN, Lasserre et al. require that all PEs support a "split horizon" scheme, meaning that a PE must not forward traffic from one PW to another, although it may (and should) forward traffic from one physical port to another and between physical ports and the PWs. Considering the scope of flooding generally, a packet to be flooded coming from a PW will never be copied to another PW on the full mesh side, but is flooded to all Ethernet ports on the same VPN. An Ethernet packet to be flooded arriving from a physical port is copied to all other physical ports and to all the full mesh PWs of the same VPN. This split behavior differs from the traditional model of 802.1D bridges.

"Hierarchical VPLS" is an extension to this model, which is also described by Lasserre et al. in the above-mentioned draft. In hierarchical VPLS, some or all of the physical interfaces on one side of the split horizon can be replaced by point-to-point PWs, which act as logical extensions of physical ports of remote nodes. In this case, there are both full-mesh PWs and point-to-point PWs (and possibly even physical ports) associated with the same VPN. The scope of forwarding and flooding is the same as described above for full-mesh PWs and physical ports.

Another option for preventing loops is to create the VPLS in a hub-and-spoke topology. In this case, only point-to-point PWs exist between the node that implements VPLS operation and edge nodes physically connected to the user ports. The bridging operation between the PWs in this case is the same as in a standard bridge, except that multiple logical bridges serve multiple users on the same physical node.

SUMMARY OF THE INVENTION

The present invention seeks to provide improved mechanisms for packet flooding in virtual private networks (VPNs), particularly Ethernet VPNs. For this purpose, in preferred embodiments of the present invention, virtual bridges in a layer-2 VPN take advantage of the inherent multicast capabilities of existing network routers, such as Internet Protocol (IP) routers, in performing split-horizon traffic forwarding. Typically, such virtual bridges comprise PEs in a VPLS network, but the principles of the present invention are similarly applicable to other types of transparent LAN-over-IP services, using other types of virtual bridge devices.

In preferred embodiments of the present invention, when a virtual bridge receives a layer-2 packet (such as an Ethernet frame) to be flooded, the virtual bridge adds an indicator that designates the packet for multicast, and passes the packet to a router. (As noted above, the reason for flooding the layer-2 packet may be that its MAC destination address is unknown, or it may be that it belongs to a broadcast or multicast MAC address family.) When an IP router is used for this purpose, the indicator attached by the virtual bridge typically comprises an IP multicast address.

The router is programmed to associate the indicator with a particular multicast group, corresponding to the destination nodes in the VPN to which the packet should be forwarded. In the case of packets received by the virtual bridge from one of the user-side in the VPN (i.e., in the VPLS context, from a CE, either directly or through a point-to-point PW), the multicast group typically includes all nodes in the VPN other than the originating node. On the other hand, for packets received by the virtual bridge on its network side (or provider domain) from another virtual bridge, the multicast group includes only the user-side nodes that are connected to the receiving virtual bridge. In either case, the router uses its built-in multicast capability to address copies of the packet to all the nodes in the appropriate multicast group. The use of router capabilities in this fashion enables targeted broadcasting within the VPN, as required by the split horizon model, while relieving the virtual bridge of the performance burden of supporting this complex broadcasting model.

In some cases, the underlying network over which the VPLS or other transparent LAN service is carried, such as an IP network, is itself multicast-capable. In such cases, the virtual bridge preferably sends the multicast packet to the network, and the routers in the existing network carry out the targeted broadcasting described above.

Alternatively, in some preferred embodiments of the present invention, a special multicast server is coupled to the virtual bridge itself. The virtual bridge passes packets to the multicast server with an indicator identifying the multicast group. The server then determines the destination addresses to which each packet should be sent, and returns the copies of the packet, appropriately addressed, to the virtual bridge for forwarding through its physical and virtual ports. As noted above, the multicast server may be used for any sort of packet flooding, whether because the MAC address is unknown, or because it refers to a broadcast or multicast group.

Although preferred embodiments are described herein with reference to certain communication protocols, and particularly to IP routers and multicast capabilities, the principles of the present invention may similarly be applied using protocols and multicast routers of other types.

There is therefore provided, in accordance with a preferred embodiment of the present invention, a method for data broadcast over a network, including:

receiving at a virtual bridge a data packet to be flooded over the network;

passing the data packet from the virtual bridge to a multicast-capable router, along with a broadcast indication;

responsive to the broadcast indication, determining at the router a group of destination addresses to which the packet should be multicast;

creating copies of the packet at the router for transmission to the destination addresses in the group; and transmitting the copies of the packet over the network.

Preferably, transmitting the copies of the packet includes transmitting the copies of the packet by tunneling through the network, most preferably by creating a virtual private LAN service (VPLS), and transmitting the copies of the packet using the VPLS. Further preferably, the virtual bridge includes a provider edge (PE) device, and transmitting the copies of the packet over the VPLS includes transmitting the copies of the packet over pseudo-wires (PWs) connecting to the PE device. In preferred embodiments of the present invention, transmitting the copies over the PWs includes sending the copies using multi-protocol label-switched (MPLS) tunnels, using Generic Routing Encapsulation (GRE), or using a Layer Two Tunneling Protocol (L2TP).

Additionally or alternatively, receiving the data packet includes receiving the data packet at the virtual bridge for transmission on a designated VPLS instance, among a plurality of VPLS instances existing on the network, and creating the copies includes including in the copies of the packet a field identifying the designated VPLS instance.

In a preferred embodiment, the multicast-capable router includes an Internet Protocol (IP) router, and wherein the broadcast indication includes an IP multicast destination address, and receiving the data packet includes receiving an Ethernet frame.

Typically, the virtual bridge has one or user-side ports, connecting the virtual bridge to user nodes, and one or more virtual ports, connecting the virtual bridge to other virtual bridges in the network, and determining the group of the destination addresses includes choosing a first group of the destination addresses if the packet is received from one of the user nodes, and a second group of the destination addresses if the packet is received from one of the other virtual bridges. In a preferred embodiment, the network includes a virtual private network (VPN), and the first group includes the destination addresses of all the other virtual bridges participating in the VPN and all the user nodes connected to the user-side ports of the virtual bridge, except the one of the user nodes from which the packet was received, and the second group includes the user nodes connected to the user-side ports of the virtual bridge while excluding the virtual bridges.

In some preferred embodiments, passing the data packet to the multicast-capable router includes passing the data packet from a forwarding engine to a multicast server associated with the virtual bridge, and transmitting the copies includes returning the copies of the packet from the multicast server to the forwarding engine for transmission by the forwarding engine to the destination addresses. Preferably, creating the copies includes addressing one of the copies to each of the destination addresses in the group. Typically, the forwarding engine has multiple ports, and creating the copies includes inserting in each of the copies of the packet a port identifier field, and transmitting the copies includes outputting the copies of the packet to the network from the forwarding engine through the ports indicated by the port identifier field. Preferably, the port identifier field includes a virtual local area network (VLAN) tag.

In other preferred embodiments, passing the packet to the multicast-capable router includes sending the packet from the virtual bridge to a router node in the network, and transmitting the copies includes multicasting the copies from the router node to the destination addresses in the group. Preferably, multicasting the copies includes adding a multiplexing tag to the copies, and the method includes determining target users to whom the copies of the packet are to be delivered responsive to the multiplexing tag and to a network source address of the copies of the packet.

Preferably, receiving the data packet includes reading a medium access control (MAC) destination address of the data packet, and determining that the data packet should be flooded over the network because the MAC destination address is unknown to the virtual bridge.

There is also provided, in accordance with a preferred embodiment of the present invention, apparatus for data broadcast over a network, including:

a multicast server, which is adapted to receive data packets for multicast over the network, and to create multiple copies of the data packets for transmission to destination addresses in a specified multicast group; and a forwarding engine, coupled to the multicast server and configured to serve as a virtual bridge having physical and virtual ports, and adapted to send and receive the data packets over the network through the ports, such that upon receiving a data packet to be flooded over the network, the forwarding engine passes the data packet to the multicast server along with a broadcast indication, which causes the server to identify the multicast group to which the copies of the packet should be sent, to generate the copies of the packet for transmission to the destination addresses in the group, and to return the copies of the packet to the forwarding engine, whereupon the forwarding engine transmits the copies of the packet through the ports.

There is additionally provided, in accordance with a preferred embodiment of the present invention, a data communication network, including:

one or more multicast routers, which are adapted to receive data packets for multicast over the network, and to create multiple copies of the data packets for transmission to destination addresses in a specified multicast group; and a plurality of virtual bridges, which have physical and virtual ports and are coupled to send and receive the data packets over the network to and from the multicast routers through the virtual ports, such that any one of the virtual bridges, upon receiving a data packet to be flooded over the network, sends the data packet to one or more of the multicast routers along with a broadcast indication, which causes the routers to identify the multicast group to which the copies of the packet should be sent, to generate the copies of the packet for transmission to the destination addresses in the group, and to transmit the copies of the packet over the network to the destination addresses in the group.

The present invention will be more fully understood from the following detailed description of the preferred embodiments thereof, taken together with the drawings in which:

DETAILED DESCRIPTION OF PREFERRED EMBODIMENTS

Figure 1:
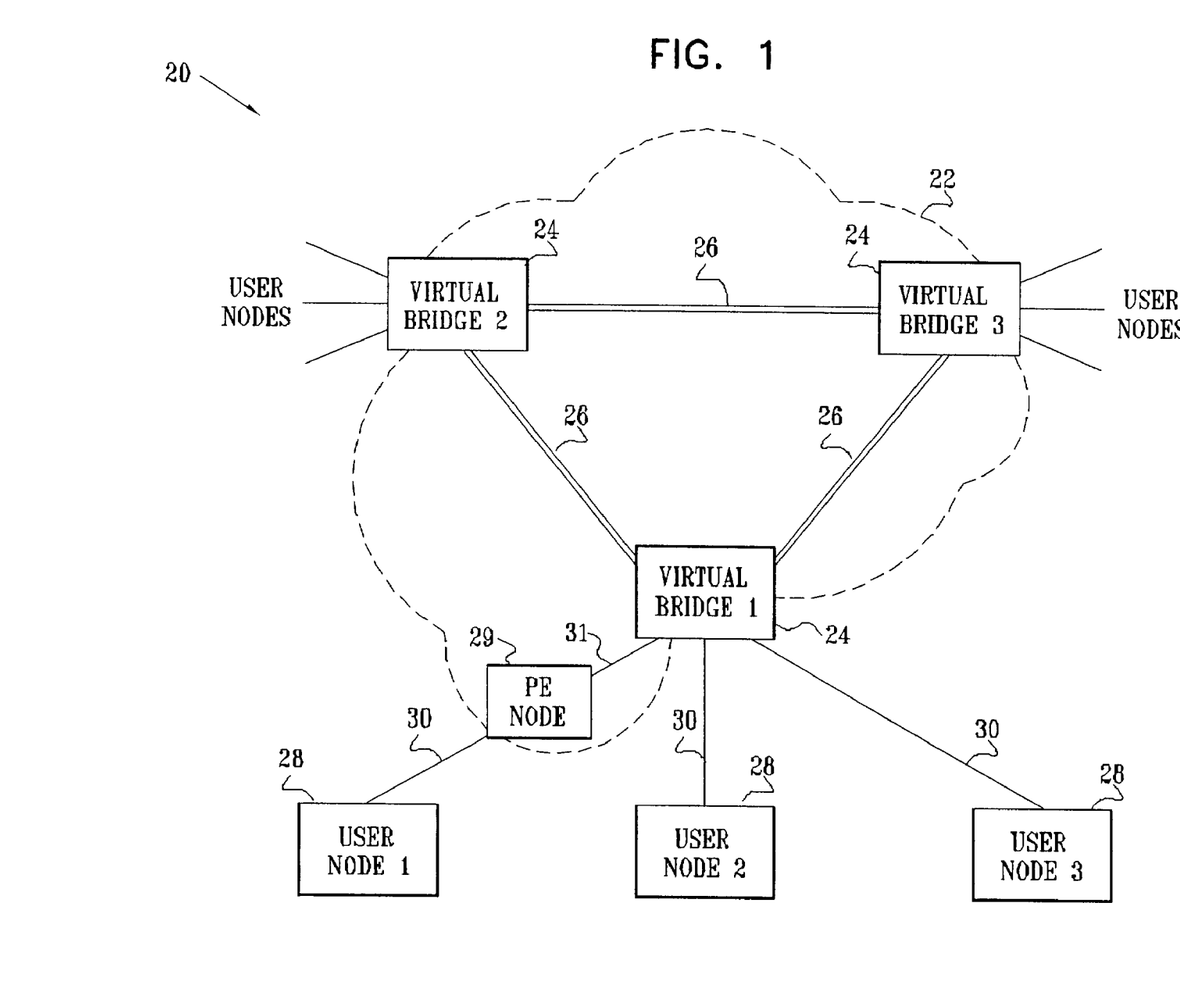
FIG. 1 is a block diagram that schematically illustrates a virtual private network (VPN), in accordance with a preferred embodiment of the present invention.

FIG. 1 is a block diagram that schematically illustrates a virtual private network (VPN) 20, in accordance with a preferred embodiment of the present invention. VPN 20 is built around a virtual private LAN service (VPLS), operating within a network 22, typically an IP or MPLS network. The VPLS is based on virtual bridges 24, or VPLS-capable PEs, which are connected by PW 26, through network 22. Virtual bridges 24 also have connections either directly to user nodes 28, or CEs, via Ethernet physical interfaces 30, or via virtual PW connections 31 to a "simple" PE node 29, which in turn is connected to the user node via physical interfaces 30. PE node 29 is able to translate physical user Ethernet ports into virtual connections, as specified in the above-mentioned draft by Martini, but does not necessarily perform bridging operations. Typically, a simple PE node provides aggregated access for many users to network 22, and the network includes many such PEs. These PE nodes are omitted from FIG. 1. for the sake of simplicity, as are redundant connections that are often provided between the user nodes or the simple PE nodes and the virtual bridges.

Virtual bridges 24 in this embodiment are connected to one another by PWs 26 in a full-mesh configuration, while user nodes 28 or simple PEs 29 are connected to the virtual bridges in a star topology. The virtual bridges are configured to support a split horizon model using IP multicast capabilities, using multicast techniques described in greater detail hereinbelow. Alternatively, the VPLS tunnels may be only partially meshed. In this case, the Spanning Tree Protocol (STP) is preferably used to prevent loops between the PE nodes. Application of STP to VPLS-type networks is described, for example, in U.S. patent application Ser. No. 10/057,332, filed Jan. 25, 2002, which is assigned to the assignee of the present patent application and whose disclosure is incorporated herein by reference. Ethernet interfaces 30 and point-to-point PW connections 31 may similarly have alternative, more complex topologies, as are known in the art. For example, a single PW connection 31 may serve multiple Ethernet interfaces 30 or other point-to-point PWs by introducing one more level of bridging in PE 29, as long as no loops are created together with the VPLS network. The VPLS and LAN topologies shown in FIG. 1 are chosen by way of example, and the principles of the present invention may be applied, mutatis mutandis, to these alternative VPLS and LAN topologies, as well.

Figure 2:
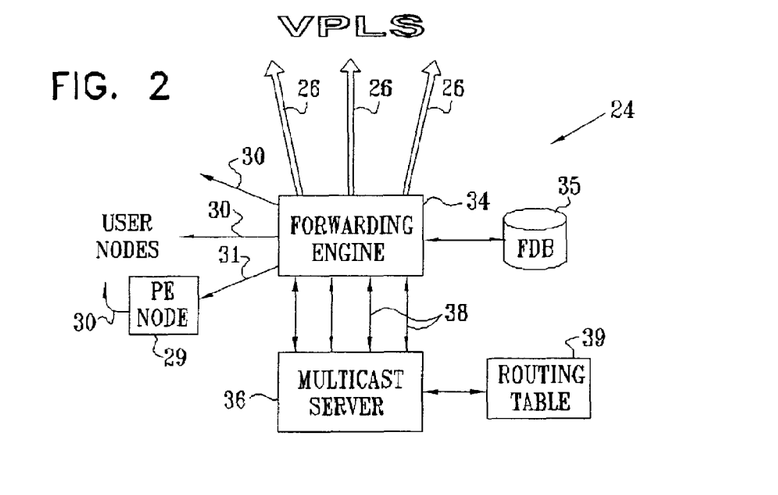
FIG. 2 is a block diagram showing details of a virtual bridge in a VPN, in accordance with a preferred embodiment of the present invention.

FIG. 2 is a block diagram that schematically shows details of virtual bridge 24, in accordance with a preferred embodiment of the present invention, in which an IP router is used as a local multicast server 36. Virtual bridge 24 comprises a forwarding engine 34, having real ports connecting to Ethernet interfaces 30 or point-to-point PWs 31, and virtual ports connecting to VPLS PWs 26. The forwarding engine treats its real and virtual ports in a substantially identical fashion. When forwarding engine 34 receives a packet over any given port, it looks up the MAC destination address of the packet in a forwarding database (FDB) 35 that it maintains. For each known destination address, the database indicates either the port or the PW through which the forwarding engine should output the packet, and the forwarding engine outputs the packet accordingly.

On the other hand, when the packet is to be flooded, either because the MAC destination address is unknown, or because the MAC destination address is a broadcast or multicast address, forwarding engine 34 passes the packet to IP multicast server 36 via an internal interface 38. Multicast server 36 implements multicast functions of an IP router, using a routing table 39, as is known in the art. IP multicast routing is described, for example, by Deering in IETF RFC 1112 (1989), entitled "Host Extensions for IP Multicasting," which is incorporated herein by reference. Multicast server 36 is not configured as a router in an IP network, however, but is instead incorporated as a part of virtual bridge 24 in support of forwarding engine 34. Multicast server 36 may comprise, for example, a communication line card, which is connected via one or more backplane traces to a main processing module comprising forwarding engine 34. Connections 38 preferably comprise VLAN connections, as specified in the above-mentioned 802.1Q standard, and each VLAN on interface 38 is treated by forwarding engine 34 as a virtual port. Alternative hardware and software implementations of virtual bridge 24 will be apparent to those skilled in the art and are considered to be within the scope of the present invention.

Figure 3:
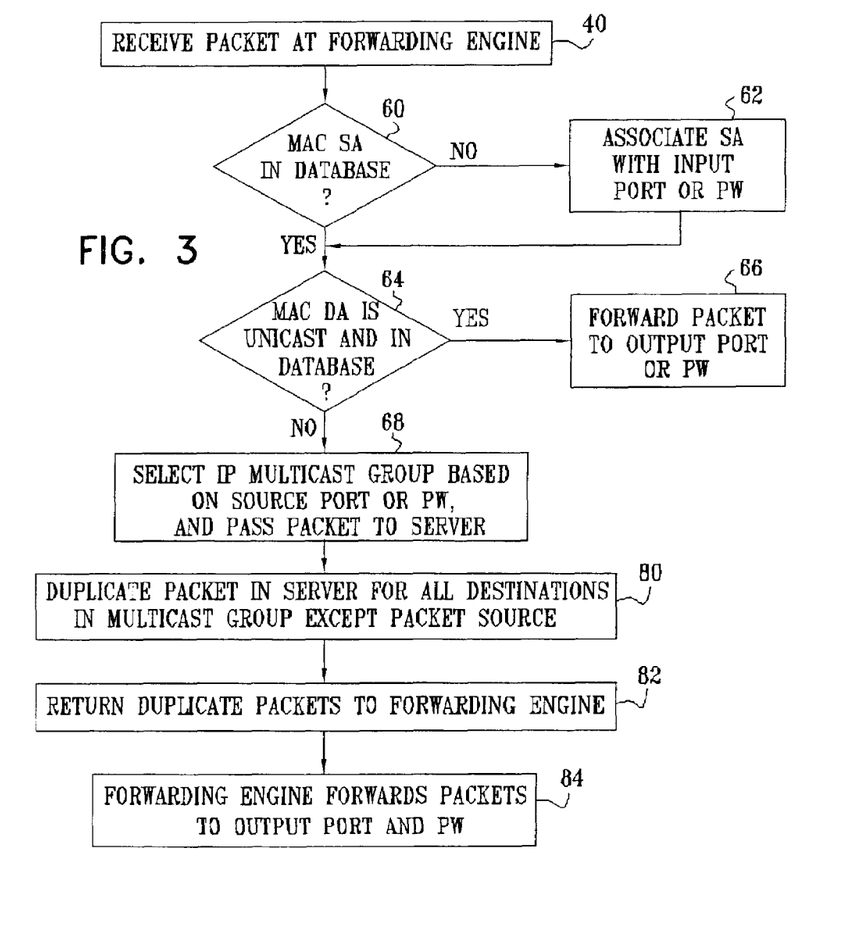
FIG. 3 is a flow chart that schematically illustrates a method for flooding data packets, in accordance with a preferred embodiment of the present invention.
Figure 4:
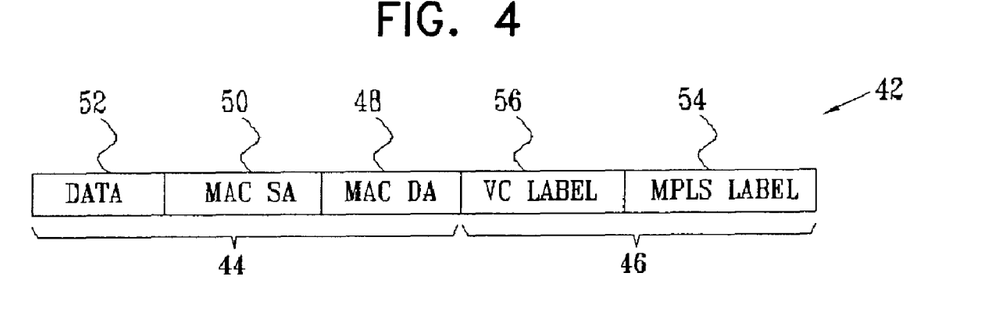
FIG. 4 is a block diagram that schematically illustrates a data packet received by a virtual bridge, in accordance with a preferred embodiment of the present invention.
Figure 5:
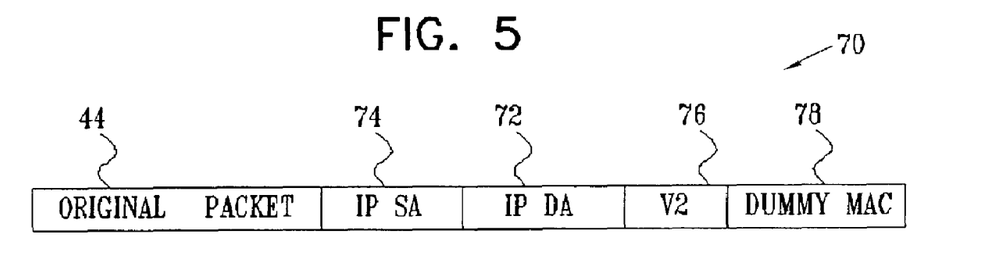
FIG. 5 is a block diagram that schematically illustrates an encapsulated multicast data packet, in accordance with a preferred embodiment of the present invention.

Reference is now made to FIGS. 3-5, which schematically illustrate a method used by virtual bridge 24 for handling data packets that it receives with unknown MAC destination addresses, in accordance with a preferred embodiment of the present invention. FIG. 3 is a flow chart that illustrates the method itself, while FIGS. 4 and 5 are block diagrams showing data packets received and sent by forwarding engine 34.

The method of FIG. 3 is initiated whenever forwarding engine 34 receives a data packet on one of its ports (real or virtual), at a packet reception step 40. The format of a data packet 42 sent or received over one of PWs 26 or virtual connections 31 is shown in FIG. 4, assuming MPLS PWs. The data packet contains an original Ethernet packet 44, which comprises a MAC destination address (DA) 48 and source address (SA) 50, along with a data payload 52. Packet 44 is encapsulated with a label stack 46, comprising a MPLS label 54 and a virtual connection (VC) label 56, as described in the above-mentioned draft by Martini. The label stack enables forwarding engine 34 to identify the VPLS instance to which packet 42 belongs. If the packet was received from a user node directly connected to interface 30, the identification of the VPLS instance is determined by the port number and possibly the VLAN field inside the data packet. The forwarding engine encapsulates outgoing packets for transmission through PWs 26 and virtual connections 31 in like fashion. Alternatively, other labeling schemes and other types of PWs, as are known in the art, such as L2TP tunnels, may be used for encapsulation and transport of packet 44.

Forwarding engine 34 checks MAC SA 50 to determine whether this address is already listed in database 35, at a source checking step 60. If not, the forwarding engine adds a record to the database, associating the MAC address indicated by SA 50 with the port or PW on which the packet was received, at an address recording step 62. Next, forwarding engine 34 checks MAC DA 48 of the incoming packet, to determine whether the output port for this MAC address is known, i.e., whether this MAC address is listed in database 35, at a destination checking step 64. If the address is a unicast address and is listed in the database, the forwarding engine simply outputs the packet through the appropriate port or PW listed in the corresponding database record, at a unicast forwarding step 66. Alternatively, the forwarding engine may be configured to forward all incoming packets to multicast server 36 (unicast or multicast, regardless of whether the port association of DA 48 is already known—although when the MAC unicast address is known, server 36 applies unicast IP routing). The multicast server then determines the output routing of each packet and returns the packet to the forwarding engine with a header indicating the proper output port. This method of packet forwarding is described below with reference to broadcast packets, but it may also be applied to unicast packets.

If MAC DA 48 of the incoming packet is not a unicast MAC address or does not appear in database 35, forwarding engine 34 is required to broadcast the packet in accordance with the split-horizon scheme applicable to VPN 20. For this purpose, the forwarding engine attaches special IP header information and passes the packet to multicast server 36, at a packet submission step 68. The IP header, which is shown in FIG. 5, includes an IP destination address (DA), which identifies to server 36 the multicast group to which this packet should be distributed. For each VPLS instance served by virtual bridge 24, two multicast groups are defined:

G1—the group of all point-to-point connections, i.e., the connections to user nodes 28, including direct physical connections 30 and virtual connections 31.

G2—the group of all connections, including both point-to-point and full-mesh connections, i.e., including PWs 26.

The membership of these multicast groups for each VPLS instance depends on the specific topology of that instance. Multiple VPLS instances with the same topology may share the same multicast groups, but for generality, we will use G1(i) and G2(i) to denote the specific multicast groups for each VPLS instance i. For each such instance, routing table 39 of server 36 is configured with lists of virtual router ports (VRPs) that correspond to the ports of forwarding engine 34 in G1(i) and G2(i).

FIG. 5 shows a preferred format for such an encapsulated packet 70, which is sent from forwarding engine 34 to multicast server 36 at step 68. The forwarding engine preferably removes label stack 46 from the incoming packet and adds the following fields for processing by multicast server 36:

An IP destination address (DA) 72, identifying the multicast group to which the packet belongs. If forwarding engine 34 received the packet through one of tunnels 26, it assigns DA 72 a first value that refers to G1(i). On the other hand, if the forwarding engine received the packet over interface 30 or PW 31, it assigns DA 72 a second value referring to G2(i).

An IP source address (SA) 74, identifying the VPLS instance on which the packet was received by forwarding engine 34.

A VRP identifier (V2) 76, corresponding to the port of forwarding engine 34 on which the packet was received. In the present embodiment, the VRP identifier has the form of a VLAN tag.

An optional dummy MAC header 78, including MAC DA and SA, which may need to be uniquely associated with the VRP, depending on specific implementation constraints of the virtual bridge.

Multicast server 36 receives packet 70 from forwarding engine 34 and looks up IP DA 72 and IP SA 74 in routing table 39. Server 36 then makes multiple copies of the packet, one for each VRP in the multicast group (G1(i) or G2(i)) indicated by IP DA 72, at a packet copying step 80. The format of the duplicated packets is thus the same as that of packet 70, but each copy has a different VRP identifier 76 (and possibly a different MAC header 78). In other words, if the packet was received by virtual bridge 24 through one of PWs 26, the packet is duplicated to all the virtual bridge ports in G1(i), i.e., all of interfaces 30 and point-to-point PW connections 31. On the other hand, if the packet was received over interface 30 or PW connection 31, the packet is duplicated to all the bridge ports in G2(i), i.e., both to PWs 26 and to interfaces 30 and PW connection 31, except for the port or PW connection through which the packet was received.

Multicast server 36 returns the duplicated packets to forwarding engine 34, at a return step 82. In each packet, IP SA 74 and VRP identifier 76 indicate uniquely to the forwarding engine the port (real or virtual) through which the packet should be output. The forwarding engine accordingly forwards the duplicate packets to all the ports and PWs in the appropriate multicast group, at a packet forwarding step 84, after first removing the IP header and adding the appropriate labeling, as shown in FIG. 4 for the case of MPLS PWs.

If server 36 is to be used for unicast forwarding, as well, additional values of unicast IP DA 72 should be listed in routing table 39 for unicast packets. The routing table maps each unicast value of DA 72 to a single VRP identifier 76. The server returns only a single copy of each unicast packet, with the appropriate VRP identifier, to forwarding engine 34, which then outputs the packet through the port indicated by the VRP identifier.

Figure 6:
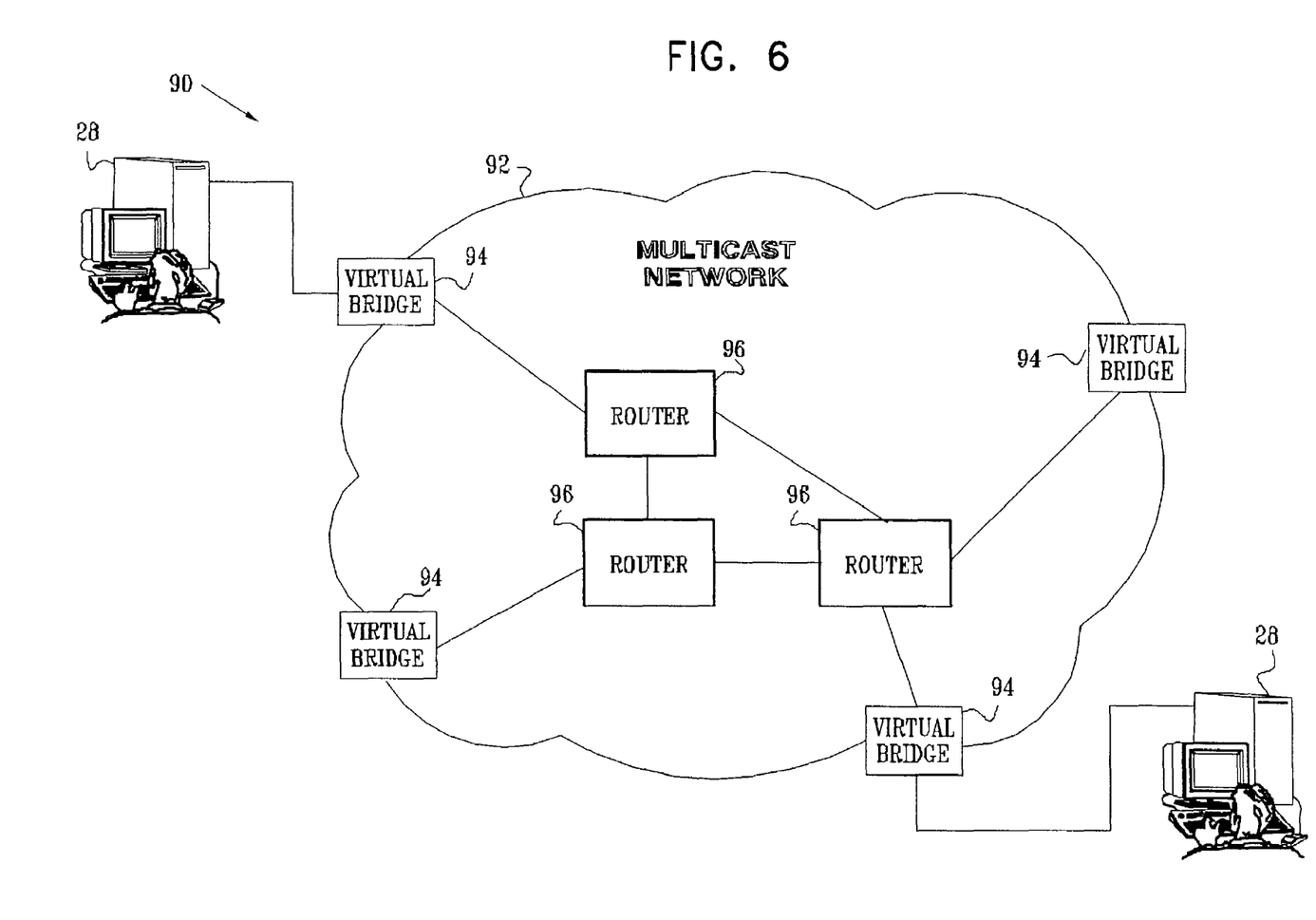
FIG. 6 is a block diagram that schematically illustrates a VPN, in accordance with another preferred embodiment of the present invention.

FIG. 6 is a block diagram that schematically illustrates a VPN 90, in accordance with another preferred embodiment of the present invention. In contrast to the preceding embodiment, VPN 90 takes advantage of existing multicast capabilities of an underlying network 92. Each user node 28 is connected to network 92 through a single physical port of a virtual bridge 94. Traffic between the virtual bridges is carried through routers 96. Assuming network 92 to be an IP network, and routers 96 to be IP routers, there is no connection-oriented association between the participating nodes in VPN 90, and routing is based on IP address only. The operation of VPN 90 is described here based on this assumption, but the principles of this embodiment may also be implemented, mutatis mutandis, using multicast routers of other types, with different characteristics. For example, routers 96 may comprise multicast-capable label-switched routers (LSRs), interconnected by MPLS tunnels.

Figure 7:
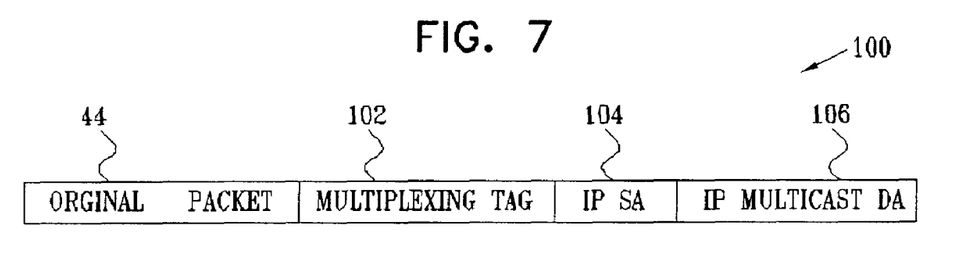
FIG. 7 is a block diagram that schematically illustrates an encapsulated multicast data packet, in accordance with a preferred embodiment of the present invention.

FIG. 7 is a block diagram that schematically illustrates the format of a packet 100 transmitted among nodes in network 92, in accordance with a preferred embodiment of the present invention. Virtual bridge 94 encapsulates original Ethernet packet 44, sent from one of user nodes 28, with a multiplexing tag 102 that identifies the VPLS instance to which the packet belongs. Typically, tag 102 comprises a MPLS VC label, as described above. Alternatively, in tunneling networks of other types, tag 102 may comprise a GRE key label or a L2TP session multiplexing field, for example. Preferably, the same tag value is used at all nodes participating in a given VPLS instance, but different tags may be used for unicast and multicast or broadcast packets. Multiplexing tags 102 for the VPLS instances that are active in network 92 are distributed among the nodes using a suitable label distribution protocol (LDP), or other means such as the Border Gateway Protocol (BGP), as are known in the art. An IP source address (SA) 104 identifies the sending node, while an IP destination address (DA) 106 identifies the destination node of each packet.

When one of user nodes 28 sends a packet to a MAC DA that is already listed in the forwarding database of its corresponding virtual bridge 94, the virtual bridge encapsulates the packet as shown in FIG. 7, and forwards the encapsulated packet by unicast over the appropriate virtual connection in VPN 90. The virtual connection may be either an explicit connection, such as a MPLS tunnel, or it may be an implicit tunnel using a connectionless forwarding technique, such as GRE or L2TP. IP DA 106 of the packet forwarded in this case simply indicates the unique destination address of the packet, which is determined by mapping the MAC DA to the appropriate destination virtual bridge in network 92. When the packet reaches the destination virtual bridge, that bridge determines the target user to whom the packet should be delivered based on multiplexing tag 102 and, if necessary, on IP SA 104 (since typically the tag is unique in the context of the source IP address.)

On the other hand, to deal with packets sent from one of user nodes 28 to a MAC DA that is unknown to its virtual bridge 94, special multicast groups are defined. Typically, each virtual bridge defines multiple different multicast groups, one for each VPLS instance in which it participates. (As in the preceding embodiment, it is possible for different VPLS instances with the same topology to have the same multicast groups.) For each VPLS instance, the multicast group defined at each virtual bridge includes all the nodes in network 92 participating in that instance, except for the virtual bridge itself. A unique IP DA is assigned to each such multicast group, and this address assignment is distributed to all the nodes in network 92 for registration in their respective routing tables.

When virtual bridge 94 receives a packet from a user node with an unknown MAC DA, it uses the format shown in FIG. 7 to encapsulate and multicast the packet. Multiplexing tag 102 and IP SA 104 are preferably the same as in the unicast case. For multicast, however, the value of IP DA 106 is the special multicast value that identifies the appropriate multicast group for the current VPLS instance. Upon receiving this packet, routers 96 identify it as a multicast packet by its IP DA, and use their inherent multicast capability to distribute the packet to all nodes in network 92. Other virtual bridges recognize the VPLS instance based on tag 102, and are thus able to forward the packet to the proper user nodes 28. These other virtual bridges also use IP SA 104 of the packet in building their own forwarding databases for processing future packet transmissions.

As in the preceding embodiment, virtual bridge 94 also multicasts packets with unknown MAC DA to all the user nodes that are attached to its real physical ports. When a packet with unknown MAC DA is sent to the virtual bridge from one of user nodes 28, the packet is multicast both over network 92 and to the other user ports of the virtual bridge. On the other hand, in accordance with the split horizon model, packets reaching the virtual bridge from network 92 are preferably distributed only to the user ports, and not back to the network. Multicast in this case is implemented simply by duplicating the original packet to the appropriate physical ports of the virtual bridge or, if the user node is connected to the virtual bridge via a PW, by sending the packet over the PW with appropriate label stacking, as shown in FIG. 4.

Although networks 22 and 92, as described hereinabove, use certain particular protocols for communication routing and tunneling, the principles of the present invention may similarly be applied using protocols, virtual bridges and multicast routers of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data broadcast over a network, comprising:
   receiving at a virtual bridge a data packet to be flooded over the network;
   adding to the data packet an Internet Protocol (IP) header comprising a multicast IP destination address;
   passing the data packet with the IP header from the virtual bridge to a multicast-capable router;
   responsive to the multicast IP destination address, determining at the router a group of destinations to which the packet is to be multicast;
   creating copies of the packet at the router for transmission to the destinations in the group; and
   removing the IP header and transmitting the copies of the packet over the network,
   wherein transmitting the copies of the packet comprises transmitting the copies of the packet by tunneling through the network, and
   wherein transmitting the copies of the packet by tunneling comprises creating a virtual private LAN service (VPLS), and transmitting the copies of the packet using the VPLS.

2. A method according to claim 1, wherein the virtual bridge comprises a provider edge (PE) device, and wherein transmitting the copies of the packet over the VPLS comprises transmitting the copies of the packet over pseudo-wires (PWs) connecting to the PE device.

3. A method according to claim 2, wherein transmitting the copies over the PWs comprises sending the copies using multi-protocol label-switched (MPLS) tunnels.

4. A method according to claim 2, wherein transmitting the copies over the PWs comprises sending the copies using Generic Routing Encapsulation (GRE).

5. A method according to claim 2, wherein transmitting the copies over the PWs comprises sending the copies using a Layer Two Tunneling Protocol (L2TP).

6. A method according to claim 1, wherein receiving the data packet comprises receiving the data packet at the virtual bridge for transmission on a designated VPLS instance, among a plurality of VPLS instances existing on the network, and wherein creating the copies comprises including in the copies of the packet a field identifying the designated VPLS instance.

7. A method according to claim 1, wherein receiving the data packet comprises receiving an Ethernet frame.

8. A method for data broadcast over a network, comprising:
- receiving at a virtual bridge a data packet to be flooded over the network;
- adding to the data packet an Internet Protocol (IP) header comprising a multicast IP destination address;
- passing the data packet with the IP header from the virtual bridge to a multicast-capable router;
- responsive to the multicast IP destination address, determining at the router a group of destinations to which the packet is to be multicast;
- creating copies of the packet at the router for transmission to the destinations in the group; and
- removing the IP header and transmitting the copies of the packet over the network,
- wherein the virtual bridge has one or more user-side ports connecting the virtual bridge to user nodes, and one or more virtual ports connecting the virtual bridge to other virtual bridges in the network, and
- wherein determining the group of the destinations comprises choosing a first group of the ports for transmission of the copies if the packet is received from one of the user nodes, and a second group of the ports for transmission of the copies if the packet is received from one of the other virtual ports.

9. A method according to claim 8, wherein the network comprises a virtual private network (VPN), and wherein the first group comprises the virtual ports connecting to all the other virtual bridges participating in the VPN and the user-side ports connecting to all the user nodes connected to the virtual bridge, except the one of the user nodes from which the packet was received, and wherein the second group comprises the user-side ports connecting to the user nodes connected to the virtual bridge while excluding the virtual ports.

10. A method according to claim 8, wherein passing the data packet to the multicast-capable router comprises passing the data packet from a forwarding engine to a multicast server associated with the virtual bridge, and wherein transmitting the copies comprises returning the copies of the packet from the multicast server to the forwarding engine for transmission by the forwarding engine to the destinations.

11. A method according to claim 10, wherein creating the copies comprises addressing one of the copies to each of the destinations in the group.

12. A method according to claim 10, wherein the forwarding engine has multiple ports, and wherein creating the copies comprises including in each of the copies of the packet a port identifier field, and wherein transmitting the copies comprises outputting the copies of the packet to the network from the forwarding engine through the ports indicated by the port identifier field.

13. A method according to claim 12, wherein the port identifier field comprises a virtual local area network (VLAN) tag.

14. A method according to claim 11, wherein passing the packet to the multicast-capable router comprises sending the packet from the virtual bridge to a router node in the network, and wherein transmitting the copies comprises multicasting the copies from the router node to the destinations in the group.

15. A method according to claim 14, wherein multicasting the copies comprises adding a multiplexing tag to the copies, and comprising determining target users to whom the copies of the packet are to be delivered responsive to the multiplexing tag and to a network source address of the copies of the packet.

16. A method according to claim 11, wherein receiving the data packet comprises reading a medium access control (MAC) destination address of the data packet, and determining that the data packet should be flooded over the network because the MAC destination address is unknown to the virtual bridge.

17. Apparatus for data broadcast over a network, comprising:
- a multicast-capable router receives data packets having a multicast Internet Protocol (IP) destination address, and to create multiple copies of the data packets for transmission to destination in a multicast group corresponding to the multicast IP destination address; and
- a forwarding engine coupled to the router and serving as a virtual bridge having physical and virtual ports, and sends and receives the data packets over the network through the ports, such that upon receiving a data packet to be flooded over the network, the forwarding engine adds to the data packet an IP header comprising the multicast IP destination address and passes the data packet with the IP header to the router, which causes the router to identify the multicast group to which the copies of the packet is to be sent, to generate the copies of the packet for transmission to the destinations in the group, and to return the copies of the packet to the forwarding engine, whereupon the forwarding engine removes the IP header and transmits the copies of the packet through the ports,
- wherein the ports of the forwarding engine comprise one or more user-side ports, for connecting the forwarding engine to user nodes, and wherein one or more of the virtual ports of the forwarding engine connect the forwarding engine to other virtual bridges in the network, and
- wherein the multicast server creates the multiple copies for transmission to a first group of the ports if the packet is received from one of the user nodes, and to a second group of the ports if the packet is received from one of the other virtual bridges.

18. Apparatus according to claim 17, wherein the forwarding engine transmits the copies of the packet by tunneling through the network.

19. Apparatus according to claim 18, wherein the forwarding engine transmits the copies of the packet using a virtual private LAN service (VPLS).

20. Apparatus according to claim 19, wherein the forwarding engine serves as a provider edge (PE) device, and transmits the copies of the packet over pseudo-wires (PWs) connecting to the PE device.

21. Apparatus according to claim 20, wherein the PWs comprise multi-protocol label-switched (MPLS) tunnels.

22. Apparatus according to claim 20, wherein the PWs comprise Generic Routing Encapsulation (GRE) tunnels.

23. Apparatus according to claim 20, wherein the PWs comprise Layer Two Tunneling Protocol (L2TP) tunnels.

24. Apparatus according to claim 20, wherein when the data packet is received for transmission on a designated VPLS instance, among a plurality of VPLS instances existing on the network, the forwarding engine inserts in the copies of the packet a field identifying the designated VPLS instance.

25. Apparatus according to claim 17, wherein the data packet comprises an Ethernet frame.

26. Apparatus according to claim 20, wherein the network comprises a virtual private network (VPN), and wherein the first group comprises the virtual ports connecting to all the other virtual bridges participating in the VPN and the user-side ports connecting to all the user nodes connected to the forwarding engine, except the one of the user nodes from which the packet was received, and wherein the second group comprises the user-side ports connecting to the user nodes connected to the forwarding engine while excluding the virtual ports.

27. Apparatus according to claim 17, wherein the multicast server addresses one of the copies of the packet to each of the destinations in the group.

28. Apparatus according to claim 17, wherein the forwarding engine has multiple ports, and wherein the multicast server inserts in each of the copies of the packet a port identifier field, indicating the ports through which the forwarding engine is to output the copies.

29. Apparatus according to claim 28, wherein the port identifier field comprises a virtual local area network (VLAN) tag.

30. Apparatus according to claim 17, wherein the data packets comprise a medium access control (MAC) destination address, and wherein the forwarding engine determines that the data packet should be flooded over the network when the MAC destination address of the data packet is unknown to the virtual bridge.

31. A network according to claim 30, wherein the data packet comprises an Ethernet frame.

32. A data communication network, comprising:
one or more multicast routers, which receive data packets having a multicast Internet Protocol (IP) destination address, and to create multiple copies of the data packets for transmission to destinations in a multicast group corresponding to the multicast IP destination address; and
a plurality of virtual bridges, which have physical and virtual ports and are coupled to send and receive the data packets over the network to and from the multicast routers through the virtual ports, such that any one of the virtual bridges, upon receiving a data packet to be flooded over the network, adds to the data packet an Internet protocol (IP) header comprises a multicast IP destination address and sends the data packet with the IP header to one or more of the multicast routers, which causes the routers to identify the multicast group to which the copies of the packet is to be sent, to generate the copies of the packet for transmission to the destinations in the group, and to remove the IP header and transmit the copies of the packet over the network to the destination addresses in the group,
wherein the virtual bridges add a multiplexing tag to the copies of the packet, and wherein the virtual bridges receiving the copies of the packet determine target users to whom the copies are to be delivered responsive to the multiplexing tag and to a network source address of the copies of the packet.

33. A network according to claim 32, wherein the virtual bridge and routers transmit the packet and the copies of the packet by tunneling through the network.

34. A network according to claim 33, wherein the virtual bridge and routers transmit the packet and the copies of the packet using a virtual private LAN service (VPLS).

35. A network according to claim 34, wherein the virtual bridge serves as a provider edge (PE) device, and transmits the packet over pseudo-wires (PWs) connecting to the PE device.

36. A network according to claim 35, wherein the PWs comprise multi-protocol label-switched (MPLS) tunnels.

37. A network according to claim 35, wherein the PWs comprise Generic Routing Encapsulation (GRE) tunnels.

38. A network according to claim 35, wherein the PWs comprise Layer Two Tunneling Protocol (L2TP) tunnels.

39. A network according to claim 34, wherein when the data packet is received for transmission on a designated VPLS instance, among a plurality of VPLS instances existing on the network, the virtual bridge inserts in the packet a field identifying the designated VPLS instance.

40. A network according to claim 32, wherein the data packets comprise a medium access control (MAC) destination address, and wherein the virtual bridges determine that the data packet should be flooded over the network when the MAC destination address of the data packet is unknown.

* * * * *